United States Patent [19]
Walters et al.

[11] Patent Number: 5,757,521
[45] Date of Patent: May 26, 1998

[54] PATTERN METALLIZED OPTICAL VARYING SECURITY DEVICES

[75] Inventors: Glenn J. Walters, Duxbury; Richard C. Shea, Hopkinton; John A. McCormick, Lakeville, all of Mass.

[73] Assignee: Advanced Deposition Technologies, Inc., Taunton, Mass.

[21] Appl. No.: 561,191

[22] Filed: Nov. 21, 1995

Related U.S. Application Data

[63] Continuation-in-part of Ser. No. 438,776, May 11, 1995.

[51] Int. Cl.⁶ ............................................. L03H 1/00
[52] U.S. Cl. .................... 359/2; 235/451; 235/380; 235/457; 235/492; 340/825.34; 342/51
[58] Field of Search ........................ 359/2; 235/441, 235/451, 457, 492, 380; 340/825.34; 342/6, 51; 380/23

[56] References Cited

U.S. PATENT DOCUMENTS

| | | | |
|---|---|---|---|
| 1,285,753 | 11/1918 | Lowenstein | 283/91 |
| 3,247,514 | 4/1966 | Haman et al. | 342/6 |
| 3,282,720 | 11/1966 | Oleksiw . | |
| 3,506,327 | 4/1970 | Lieth et al. | 359/23 |
| 3,810,147 | 5/1974 | Lichtblau | 340/572 |
| 3,881,800 | 5/1975 | Friesem | 359/25 |
| 4,014,602 | 3/1977 | Ruell | 359/2 |
| 4,034,211 | 7/1977 | Horst et al. | 253/61.12 N |
| 4,119,361 | 10/1978 | Greenaway | 283/88 |
| 4,129,382 | 12/1978 | Greenaway | 356/71 |

(List continued on next page.)

FOREIGN PATENT DOCUMENTS

| | | | |
|---|---|---|---|
| 0075674A2 | 4/1983 | European Pat. Off. . | |
| 0253089A1 | 1/1988 | European Pat. Off. . | |
| 41 02 435 A1 | 8/1992 | Germany | G06K 19/07 |
| 42 05 827 A1 | 9/1993 | Germany | G06K 19/07 |
| 2027441 | 2/1980 | United Kingdom . | |
| 2136352 | 9/1984 | United Kingdom . | |
| WO 96/36010 | 11/1996 | WIPO | G06K 19/16 |

*Primary Examiner*—Paul M. Dzierzynski
*Assistant Examiner*—Darren E. Schuberg
*Attorney, Agent, or Firm*—Wolf, Greenfield & Sacks, P.C.

[57] ABSTRACT

Security devices which are difficult to reproduce include a grid screen metallization pattern. The grid screen metallization pattern may be laid down over a hologram or diffraction grating formed as a surface relief pattern on a substrate, to form a visually identifiable, semi-transparent security device. Additionally, the metallization pattern may include resonant structures in which information about the security device is encoded. In some embodiments of these security devices, the metallization pattern is disposed in accurate registration with the underlying hologram or diffraction grating. These security devices are made by methods which include printing an oil pattern on the substrate. Areas on which oil is deposited do not receive metal during a metallization step. Since these methods do not use caustics, metallization patterns including features which would otherwise trap and hold caustics are possible.

25 Claims, 9 Drawing Sheets

U.S. PATENT DOCUMENTS

| | | | |
|---|---|---|---|
| 4,168,088 | 9/1979 | Somlyody | 283/8 R |
| 4,210,346 | 7/1980 | Mowry, Jr. et al. | 283/8 B |
| 4,304,809 | 12/1981 | Moraw et al. | 428/195 |
| 4,341,404 | 7/1982 | Mowry, Jr. et al. | 283/8 B |
| 4,398,894 | 8/1983 | Beckett | 156/659.2 |
| 4,417,784 | 11/1983 | Knop et al. | 359/568 |
| 4,421,380 | 12/1983 | McGrew | 359/23 |
| 4,484,797 | 11/1984 | Knop et al. | 359/568 |
| 4,552,614 | 11/1985 | Beckett | 156/640 |
| 4,576,439 | 3/1986 | Gale et al. | 359/572 |
| 4,589,686 | 5/1986 | McGrew | 283/85 |
| 4,591,707 | 5/1986 | Stenzel et al. | 235/493 |
| 4,662,653 | 5/1987 | Greenaway | 283/91 |
| 4,673,609 | 6/1987 | Hill | 428/187 |
| 4,677,285 | 6/1987 | Taniguchi | 235/488 |
| 4,685,138 | 8/1987 | Antes et al. | 382/12 |
| 4,717,221 | 1/1988 | McGrew | 359/15 |
| 4,728,377 | 3/1988 | Gallagher | 156/58 |
| 4,765,656 | 8/1988 | Becker et al. | 283/70 |
| 4,856,857 | 8/1989 | Takeuchi et al. | 359/3 |
| 4,913,858 | 4/1990 | Miekka et al. | 264/1.3 |
| 5,063,418 | 11/1991 | Shurtz, II et al. | 357/15 |
| 5,103,210 | 4/1992 | Rode et al. | 342/51 |
| 5,142,383 | 8/1992 | Mallik | 359/2 |
| 5,159,181 | 10/1992 | Bartels et al. | 235/441 |
| 5,513,019 | 4/1996 | Cueli | 359/2 |
| 5,517,195 | 5/1996 | Narlow et al. | 342/51 |
| 5,552,790 | 9/1996 | Gunnarsson | 342/51 |
| 5,581,257 | 12/1996 | Greene et al. | 342/51 |

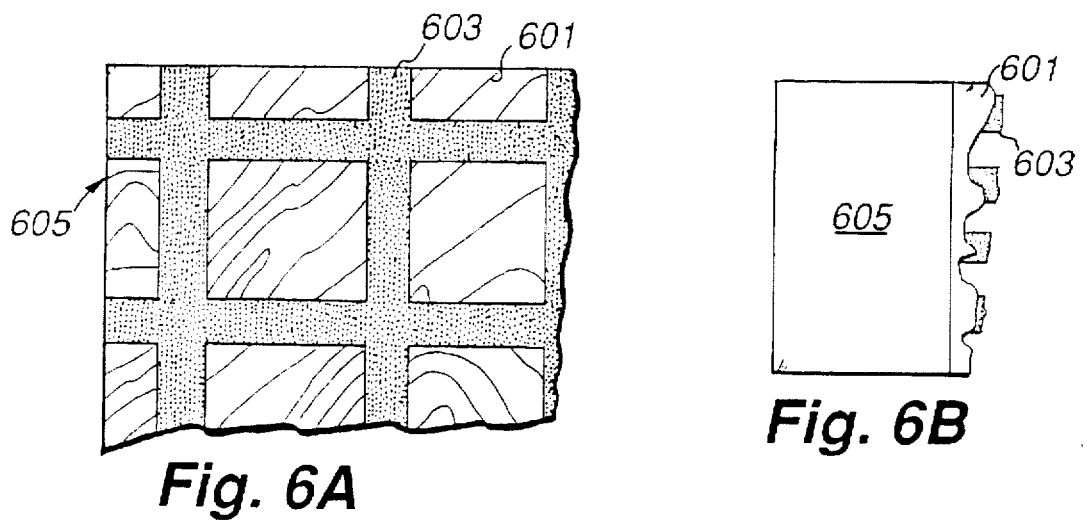
Fig. 6A
Fig. 6B
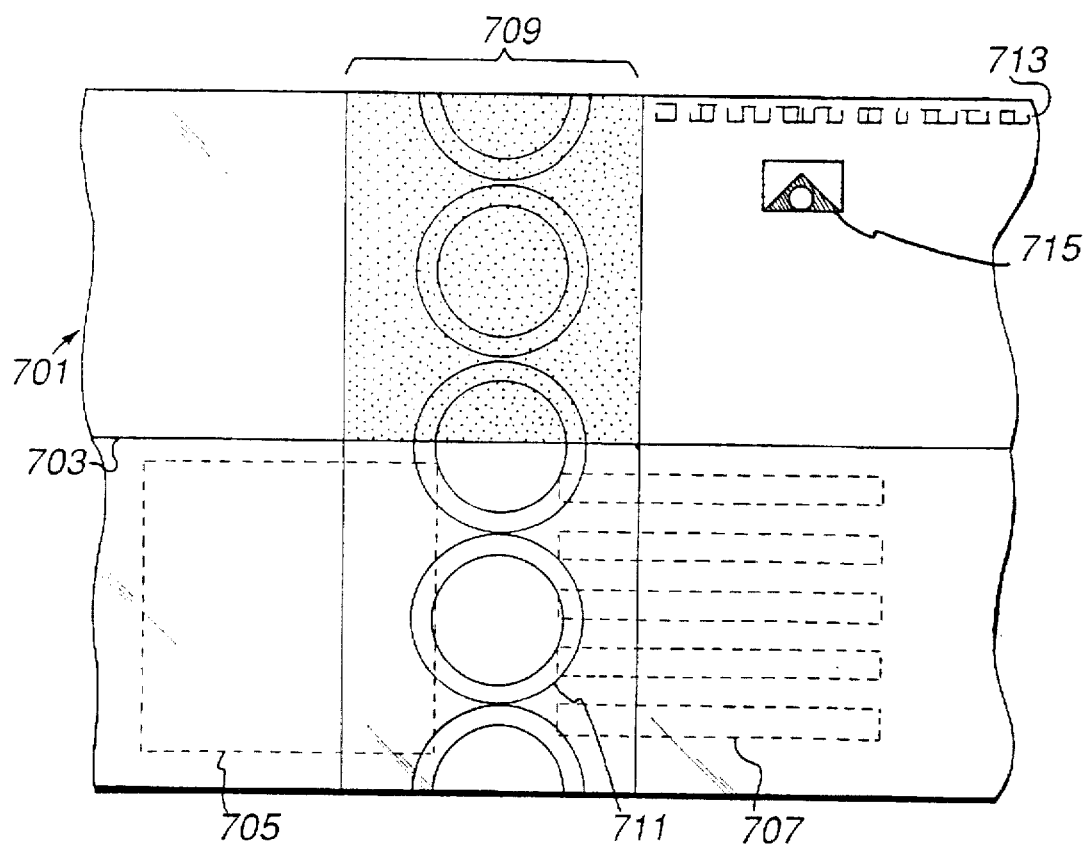
Fig. 7A

5,757,521

PATTERN METALLIZED OPTICAL VARYING SECURITY DEVICES

This is a Continuation-in-Part patent application of Ser. No. 08/438,776, filed May 11, 1995.

FIELD OF THE INVENTION

The present invention generally relates to authenticating devices, and more particularly relates to holograms used as security and anti-counterfeiting components of personal identification cards, credit cards, product labels, documents, currency and the like.

BACKGROUND OF THE INVENTION

Holograms are commonly used as authenticating devices since the hologram, providing a three-dimensional image, is difficult to copy or reproduce. Holograms are records of an interference pattern formed by light at a recording location. Typically a photographic plate, placed at the recording location, is used to make and preserve an original holographic record. Commonly, the recorded interference pattern is that of a three dimensional image of a subject.

Many techniques are available for recording a hologram. In one technique, illustrated in FIGS. 5A–5C, a laser light source is used since it produces a beam of light 501 whose waves are coherent, i.e. whose peaks and valleys are in synchronous alignment. The beam 501 is split by a beam splitter 503 into an object light beam 505 and a reference light beam 507. The object light beam 505 is directed onto the subject recorded 509 and reflects off the surfaces of the subject 509 as an image beam 511 onto a photographic plate 513. The reference light beam 507 travels directly to the photographic plate 513 over a fixed path. Since the surfaces of the subject recorded 509 are at different depths relative to the photographic plate 513, different parts of the image beam 511 travel different distances. The waves of the image beam 511 both constructively and destructively interfere with the waves of the reference light beam 507 at the photographic plate 513 since the peaks and valleys of the light waves arrive at the photographic plate 513 in different alignment. The interference pattern formed by the constructive and destructive interference is recorded as a pattern of light and dark areas on the photographic plate 513, forming a laser-viewable master hologram H1.

It is desired to produce a hologram which is viewable without a laser reference beam. Therefore, the hologram H1 produced as described in connection with FIG. 5A forms a master for producing a secondary hologram H2, as now described in connection with FIG. 5B.

The secondary hologram H2 is formed by recording the interference pattern formed by illuminating the master hologram with a reference laser beam 515. The reference laser beam 515 is split by a beam splitter 517 into two light beams, one of which is passed through the master hologram to form an image beam 519, which falls onto a photographic plate 521. The reference light beam 515 is directed onto the photographic plate 521, where the reference light beam 515 and the image light beam 519 form an interference pattern representative of a three dimensional image 523 of the original subject 509.

Finally, as shown in FIG. 5C, the secondary hologram H2 may be viewed using reflected ordinary light. The interference pattern representative of the three dimensional image of the original subject 509 appears along a secondary axis 525, while an ordinary reflection of the light source appears along a primary reflection axis 529.

Reproducing a large volume of holograms photographically in high volumes is not economically viable. Therefore, commercial holograms are most commonly produced by embossing or casting a relief pattern on a thin film. The relief pattern is often representative of the interference fringes of an original hologram, which may have been photographically recorded. The relief pattern is simply a pattern of ridges on a surface of the thin film. The spacing between the ridges and the width of the ridges corresponds to the spacing and width of the interference fringe pattern in the original hologram. However, the relief pattern itself is not readily seen because the reflectivity, scattering, or transmissivity is insufficient to produce a visible reconstructed light pattern. While some non-metallic materials are deposited on holographically embossed structures to amplify the holographic relief pattern (so-called transparent commercial holograms), most commercial holograms use a thin metallic layer to amplify the holographic relief pattern by reflection. Such metallically amplified holograms are generally opaque. Typically, the metal used for holograms in security devices is aluminum applied using a vacuum evaporative process.

One important difference arises between the original photographic hologram and the commercial hologram embodied in a relief structure. The photographic hologram includes information representing both amplitude, i.e. brightness, and phase, i.e. interference pattern spacing. The three dimensional images of commercial holograms have a substantially uniform brightness. Thus, even when amplified by metal deposition, they may be difficult to see.

Although not considered true holograms, various patterned diffraction gratings may also be produced by similar methods. While a hologram may be considered to be a special type of diffraction grating, non-hologram diffraction gratings are often sufficiently difficult to reproduce to be appropriate for use in some security applications.

Various credit and identification cards, as well as some product labels, employ commercial holograms or diffraction gratings to deter counterfeiting by providing a visual indication of authenticity. Some product labels and currency depend on fine plastic threads with metallic print to increase the difficulty of counterfeiting, also by providing a visual indication of authenticity. Both holograms and fine metallic print are used together in these and other applications, because the visual indication of authenticity is both difficult to reproduce by conventional means and easily verified by direct observation. For further security, the hologram or metal printing security device may be secured to the document such that the security device will be destroyed or otherwise exhibit evidence of tampering upon any attempt to remove the security device. This will be discussed in further detail below.

An example of the application of this conventional technology to the production of secure documents is now described in connection with FIGS. 1–4 from Mallik. U.S. Pat. No. 5,128,779.

As shown in FIG. 1, an identification card 101 may include both textual information printed thereon 103, and an identification image 105, e.g. your picture, applied thereto. An overlaminate 107, having a semi-transparent hologram 109 embossed thereon, is affixed to the surface of identification card 101. The semi-transparent hologram 109 may be produced a number of ways. For example, in Mallik, a microscopic chemically etched, non-continuous, metallic dot pattern is used to produce amplified holograms having a light transmissivity of about 50% (FIG. 2).

Security holograms are normally attached to a document by one of two methods which are selected to provide tamper evidence if one attempts to alter the protected document.

One attachment method is simply to use a pressure sensitive adhesive 301 having a high sheer strength. The overlaminate carrying hologram 109 is tightly pressed together with document 101 at room temperature to form a bond. After manufacture of the commercial hologram 303, the adhesive 301 is generally covered by a protective release paper layer 305 for storage and shipping, which is removed just before application to a document 101. If the sheer strength of the adhesive 301 is sufficiently high, then the metal 307 of the hologram 109 is stripped away from the overlaminate 107 if one attempts to remove the overlaminate 107 from the document 101.

A more popular method of attachment, particularly in high volume operations such as found in applying holograms to credit cards, is a hot stamping technique. In hot stamping, the hologram is carried on a flexible carrier sheet 309 with a wax-like release coating 311. The release coating 311 is chosen to melt at a much lower temperature than the adhesive 301. After the overlaminate 107 itself is fully pressed against the document 101 at an elevated temperature, the overlaminate 107 is pulled from the carrier 309 and adheres to the document 101. In the hot stamping operation, a release layer 305 is not used. Hot stamping also relies on a high sheer strength of the adhesive 301 to visually alter the hologram 109 during tampering, by removing metal 307 from the hologram 109 embossed on the overlaminate 107.

After attachment by either method, the structure appears as shown in FIG. 4.

The fine thread of metallic print found in some currencies and other security devices and the metallic dot screen used in semi-transparent holograms conventionally is obtained by a demetallization process. The pattern is formed by first metallizing a roll of clear plastic material, usually polyethylene teraphthalate (PET), over its entire surface. Unwanted metal is removed by an etching process—either by selectively applying a caustic solution to metal to be removed or by protecting the metal to be retained with a lacquer, and then applying a caustic solution to the entire metallic surface.

Mallik uses dot screens which are non-continuous patterns of dots, i.e. dots which are not connected with each other, applied over a surface. The security devices disclosed in Mallik employ a uniform dot screen to amplify a commercial hologram, while permitting a high degree of light transmissivity through the commercial hologram. Mallik uses a relatively thick metallic layer, for compatibility with his method for making the dot screen. The metallic layer may be 200–600 Å thick.

Mallik further discloses several methods of fabricating a semi-transparent, dot screen hologram. The methods of forming the dot screen as a non-continuous reflective layer include: 1) lacquer demetallization with dilute sodium hydroxide of a relatively thick (i.e. 200–600 Å) aluminum layer formed by vacuum evaporation, in which a continuous metallized substrate is printed where metal is to be retained with a lacquer impervious to the sodium hydroxide; 2) direct or lacquerless demetallization with dilute sodium hydroxide; 3) printing a liquid form of aluminum; and 4) evaporation of aluminum through a solid mask. These methods may also be used to produce fine metallic text, such as used on security threads in some currencies.

Mallik's preferred method of forming the non-continuous reflective areas of the semi-transparent or non-continuous reflective hologram is lacquer demetallization. This method produces satisfactory semi-transparent areas comprised of minute, relatively thick, isolated reflective islands, i.e. a dot screen. However, when semi-transparent areas formed of minute clear apertures within a continuous metallic grid, i.e. a grid screen, are attempted using Mallik's preferred method, lacquer demetallization, the results are generally unsatisfactory.

Continuous metallic grids which have been attempted using a demetallization process are subject to erosion of the metallic grid due to the difficulty in removing or neutralizing the caustic used to etch the metallic layer. The caustic becomes trapped in wells formed by the patterned lacquer and etched apertures in the metallic layer and cannot easily be neutralized or washed out. As a result, over time the metallic layer is completely destroyed by over-erosion. On the other hand, in a dot screen, demetallized patterns of isolated metallic islands inherently include channels in the patterned lacquer to facilitate the washing away or neutralizing of the caustic. Over-erosion of metallic grids is particularly pronounced when the layer of metal being etched is very thin. Controlling the demetallization of thin metallic layers is particularly difficult, because the metal is removed from thin areas at a relatively high rate, compared to thicker areas. Furthermore, when etchant is applied to the metal layer, it continues to react with the metal layer until either the metal neutralizes the etchant applied, or the etchant is washed off. Thin layers may continue to erode, even after washing, because washing may not completely remove the etchant applied.

Another problem of current holographic security devices is that improvements in technology have made them somewhat easier to copy. Although the present generation of devices is still difficult to copy, added protection at a minimal cost increment is still sought.

Finally, current security devices generally require visual inspection, possibly with the aid of special equipment to verify authenticity. Quick, automatic security scanners currently require additional features to be incorporated into identification cards, product labels, and the like. Such features may include bar codes, microwave resonant structures, and various other electrically or optically detectable features which may be remotely sensed. Adding these features to identification cards, product labels and the like complicates the production of the objects or documents to which the security devices have been attached.

SUMMARY OF THE INVENTION

The above problems are solved by various aspects of the methods and devices in accordance with the present invention.

According to one aspect of the invention, there is a pattern metallized security device, comprising: a substrate, one surface of which includes a surface relief pattern; and a metallic pattern disposed thereon in registration with the surface relief pattern; wherein the metallic pattern forms a high frequency resonant structure. This aspect of the invention may further include metallic letterforms disposed on the substrate, and the metallic letterforms may be too small to be distinguished with unaided eyes.

A second aspect of the invention is a pattern metallized security device which may include: a substrate; an integrated circuit device disposed on the substrate; and a metallic pattern disposed on the substrate and defining conductive regions on the substrate, including means connected to the integrated circuit for receiving power electromagnetically coupled thereto. In this device, the metallic pattern may further comprise means connected to the integrated circuit for coupling thereto an electromagnetic signal. The means for coupling may be, for example, an antenna which transmits and receives high frequency electromagnetic signals. The means for receiving power may include an inductive loop which receives from a proximate source of radiated power sufficient electromagnetic energy to power the integrated circuit. There may also be provided an antenna which couples high frequency signals to the integrated circuit. Finally, this aspect of the invention may be used in combination with the first aspect of the invention, by further providing a surface relief pattern on a surface of the substrate, and arranging for a region of the metallic pattern to be disposed on the surface relief pattern in registration with the surface relief pattern.

A method of authenticating an article forms a third aspect of the invention. The method may comprise the steps of: adhering to the article a surface relief hologram; disposing a metal pattern between the surface relief hologram and the article; illuminating the metal pattern with electromagnetic energy swept over a predetermined frequency range and at a predetermined rate; and analyzing re-radiated electromagnetic energy to authenticate the article. The method of this aspect of the invention may by modified in that the step of analyzing may further comprise the step of comparing a spectrum of the re-radiated electromagnetic energy to an expected spectral signature of the metal pattern.

A method of authenticating an article according to a fourth aspect of the invention may comprise the steps of: adhering to the article a surface relief hologram; disposing a metal pattern between the surface relief hologram and the article; measuring a plurality of reflection coefficients of the metal pattern at a corresponding plurality of frequencies; and comparing each reflection coefficient with an expected reflection coefficient at a corresponding frequency.

In accordance with a fifth aspect of the invention, there is provided a method of authenticating an article, which may comprise the steps of: adhering to the article a device including a surface relief hologram; disposing a metal pattern between the surface relief hologram and the article; measuring capacitance of the metal pattern; and comparing the capacitance measured with an expected capacitance. Also in accordance with this aspect of the invention, authentication may be deactivated by performing the steps of: forming the metal pattern of a plurality of areas connected by a fusible link; and generating an electric current between the plurality of areas, thereby causing the fusible link to break. Further in accordance with this aspect of the invention, the step of generating may further comprise any one of the steps of: (a) bringing an electric charge into proximity with the plurality of areas, (b) applying an electric field to the plurality of areas, and (c) applying a time-varying magnetic field to the plurality of areas.

In accordance with a sixth aspect of the invention, a complete pattern metalized security system may include: a substrate, one surface of which includes a surface relief pattern; a metallic pattern disposed thereon; and a probe having a plurality of capacitive plates of opposite polarity; wherein the first metallic pattern is disposed in such a position that a projection thereof on an outermost surface of the substrate covers an area linking at least two plates of opposite polarity of the probe. The system may be enhanced by providing a second metallic pattern disposed in a position electrically insulated from the metallic pattern and also having a projection on the outermost surface of the substrate linking the at least two plates of the opposite polarity of the probe. The system may be enhanced by constructing the first metallic pattern of a plurality of conductive areas electrically connected by fusible links.

Finally, a seventh aspect of the invention is a pattern metallized security device, which may include: a substrate having a surface relief pattern disposed thereon; a metallic pattern disposed thereon in registration with the surface relief pattern; wherein the metallic pattern forms elements of an electromagnetic circuit. The electromagnetic circuit elements could be capacitors or antennae, for example. A plurality of the elements formed by the metallic pattern may be interconnected by a transparent conductor. Alternatively, a plurality of the elements formed by the metallic pattern may be interconnected by a readily oxidizable substance disposed on a surface of the substrate. If interconnections are formed by a readily oxidizable substance, a layer of adhesive may be disposed on the surface of the substrate, protecting the readily oxidizable substance disposed thereon from exposure to ambient atmosphere.

BRIEF DESCRIPTION OF THE DRAWINGS

In the figures, in which like reference numerals denote like structures:

FIGS. 6A and 6B are a plan view and a cross-section of a detail of a security device according to one aspect of the present invention;

FIGS. 7A–7E are plan views of overlaminate blanks prepared in accordance with various aspects of the present invention;

DETAILED DESCRIPTION

Figure 1:
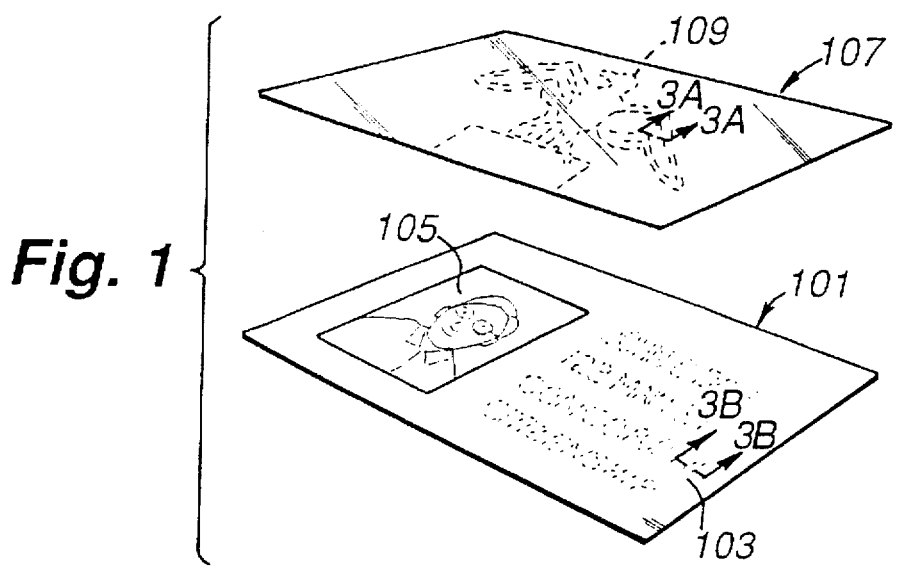
FIG. 1 is an exploded view of a document incorporating a holographic security device.
Figure 2:
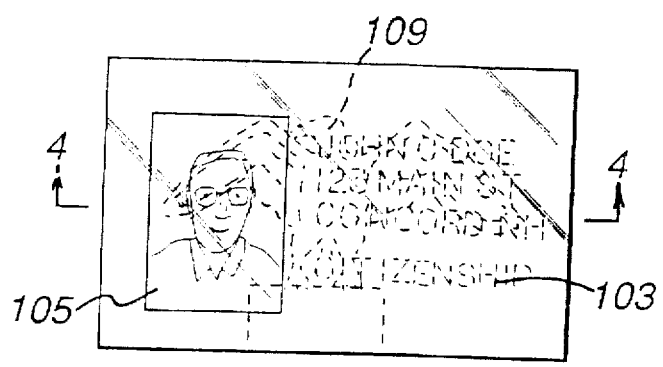
FIG. 2 is a view of the face of the document of FIG. 1.
Figure 3A:
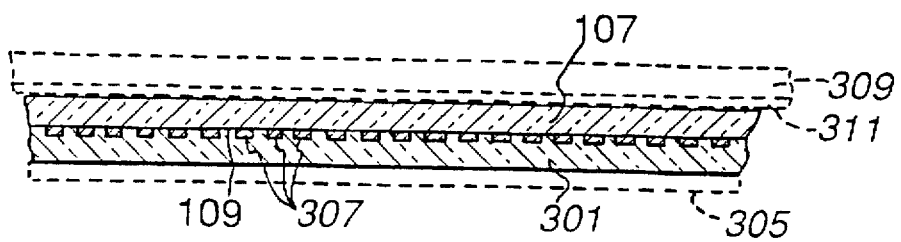
FIGS. 3A and 3B are cross-sectional views of the overlaminate and underlying document of FIG. 1, respectfully.
Figure 3B:
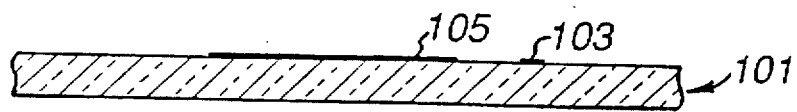
Figure 4:
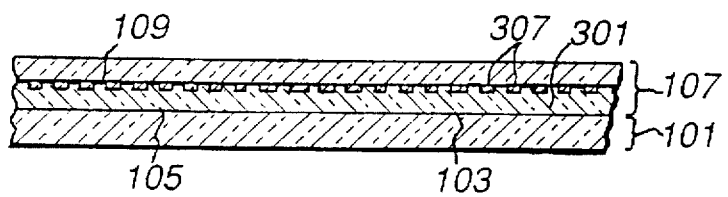
FIG. 4 is a cross-sectional view of the assembled document of FIG. 2.
Figure 5A:
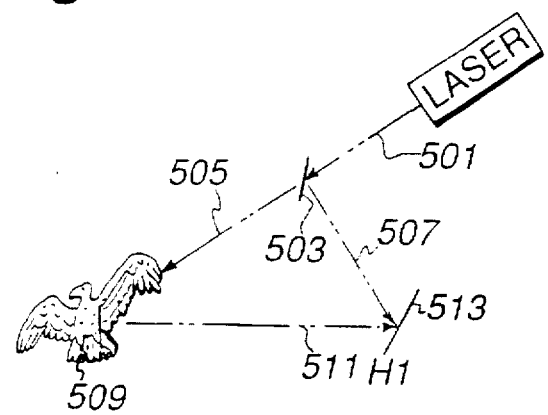
FIGS. 5A, 5B and 5C are schematic illustrations of general holographic principles.
Figure 5B:
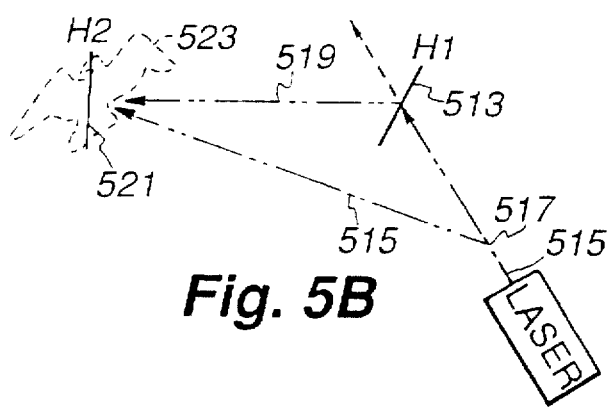
Figure 5C:
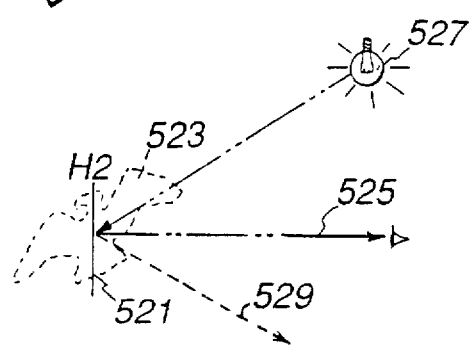

The present invention will be better understood upon reading the following detailed description, in connection with the drawings.

A structure prepared in accordance with one aspect of the present invention is generally illustrated in FIGS. 6A and 6B. The structure includes a commercial hologram, formed as a surface relief pattern 601 and a metallization layer 603 deposited thereon.

Although the illustrated structure is described as made by first preparing a commercial hologram 601 on a substrate 605 and then applying a metal layer 603, it could also be made by first metallizing a substrate 605 and then forming on the surface a commercial hologram 601. The structures which are produced by either technique, however, both conform to the general description given.

An underlying surface relief hologram 601 is first prepared using conventional techniques. A surface relief pattern which represents the interference pattern recorded in an original hologram is provided on a substrate 605, for example, by means of the hot press method or the continuous casting method. Both of these methods are well known to those skilled in this art. The surface of the hologram 601 is then pattern metallized printed (PMPed), to form a continuous grid-like pattern referred to hereinafter as a grid screen 603. Although reference is herein made to pattern metallized printing of a metallic layer, it should be understood by those skilled in this art that the described technique is also applicable to the production on a substrate of a high index of refraction layer. Such high index of refraction materials are also suitable for amplifying commercial holograms, e.g. commercial hologram 601. In the grid screen 603, the spacing between grid lines should be narrow enough not to disturb an average viewer. A spacing of approximately 0.017 inch or less has proven satisfactory. The grid line widths should be selected so as to provide a light transmissivity of about 70% to permit easy viewing and partial transparency. Satisfactory transmissivities in the vicinity of 70% have been achieved using a metal coverage of about 25%. However, for special purposes requiring a stronger or weaker semi-transparent holographic effect, metal coverage substantially in the range of 5–80% can be used. The semi-transparent holographic effect can also be varied by varying the metal layer thickness from 10–1,000 Å. The optical density of metal layers may be adjusted by adjusting the thickness of the layer, as well as by adjusting the metal coverage.

Security devices employing the characteristics described above have several advantages not realized by conventional security devices. The new device is harder to copy than older devices because it is difficult to satisfactorily produce using the above discussed conventional demetallization techniques. Instead, the present security device is preferably made by direct metal vapor pattern deposition in a vacuum chamber.

A method of making these devices using a vacuum chamber is described below. When made according to this preferred method, no caustic is used; thereby eliminating the concern about caustic residue. Finally, by using a grid screen, which is conductive and has variable electromagnetic filtering characteristics, security devices may be made to bear electromagnetic signatures. A conductive continuous grid structure having given grid spacing, conductivity and line thickness will reflect substantially all the energy below a predetermined frequency. The grid should be about 1/16 the wavelength of the highest frequency to be reflected. As will be understood by those skilled in this art, this is merely a rule of thumb intended to achieve a substantial degree of reflectivity at the predetermined frequency. The rule and the frequency may be varied to suit particular purposes. Thus, by varying the grid spacing, conductivity and line thickness, different grids may be applied to a device to pass selected spectra, which constitute the electromagnetic signatures.

As illustrated in FIG. 7A–7E, the metallization pattern can mix a variety of known structures, including high frequency resonators and antennas, and the like. The regions referred to below as semi-transparent holograms or semi-transparent diffraction gratings have a micro-structure substantially as discussed above in connection with FIGS. 6A and 6B.

The structures which may be incorporated in the metallization are not limited to those having clear channels through which to wash etchant. Instead, the structures include holes through the metal wherein etchant is trapped, if made by conventional demetallization. The front and back overlaminates of FIGS. 7A–7E are each prepared as single sheets 701, intended to be folded in half along a fold line 703, about the secured document (picture 705 and text 707 shown in phantom).

Figure 7B:
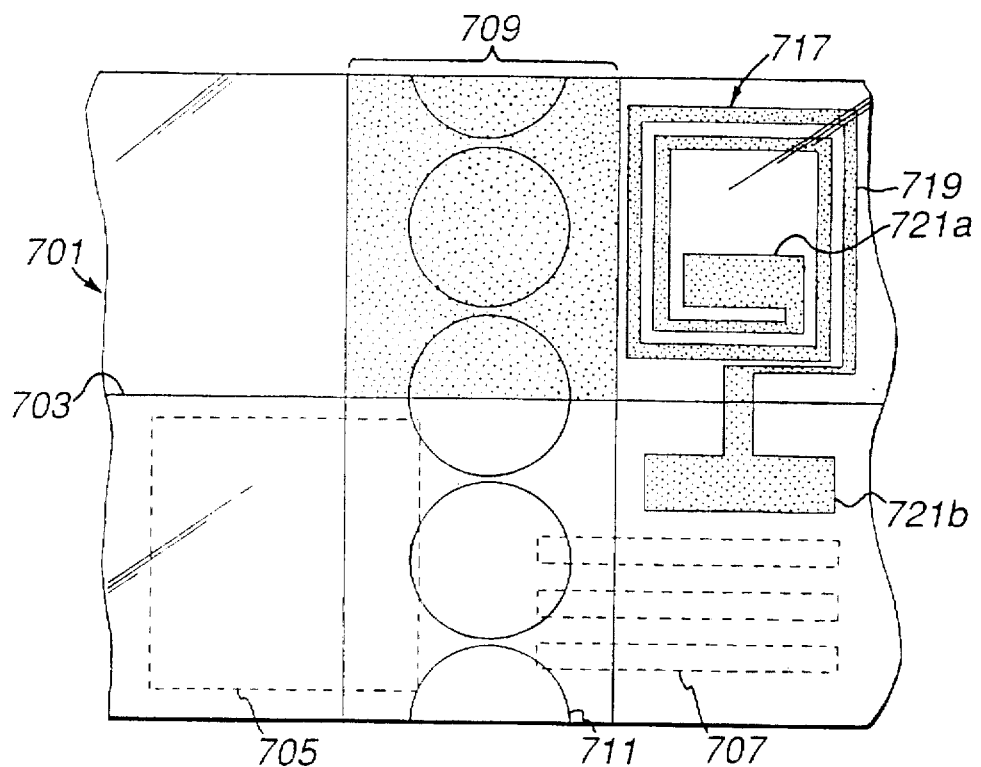
Figure 7C:
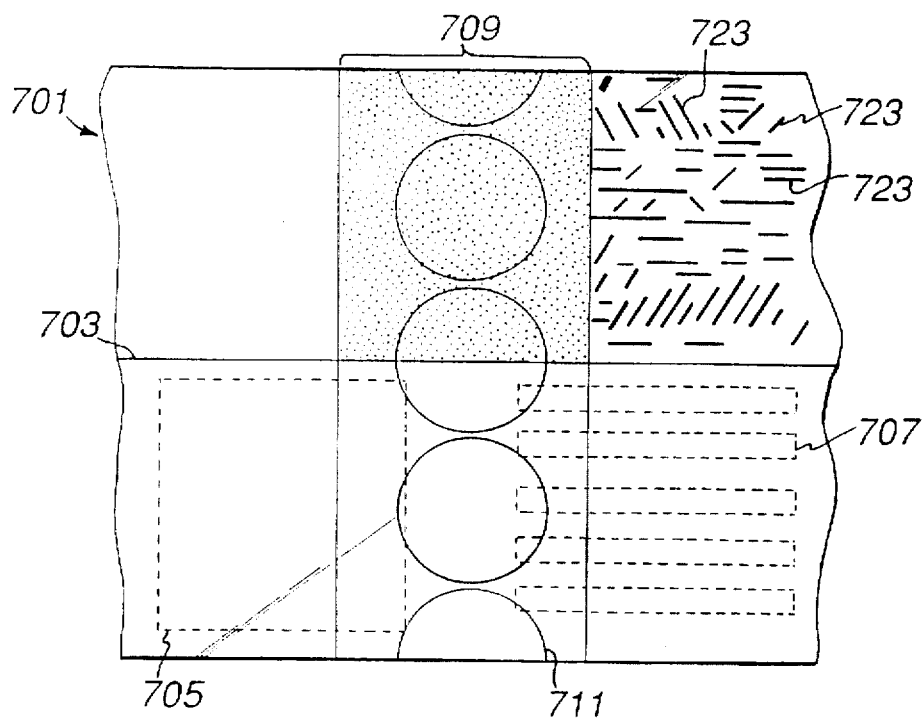
Figure 8:
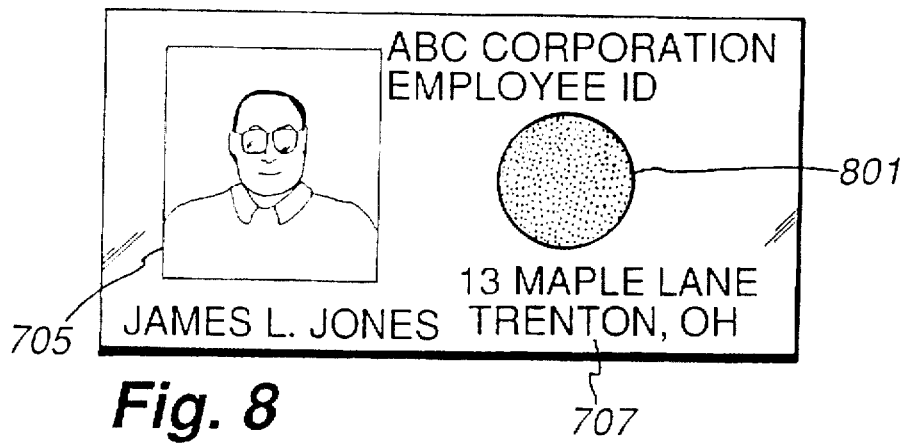
FIG. 8 is a secured document prepared in accordance with another aspect of the present invention.
Figure 9:
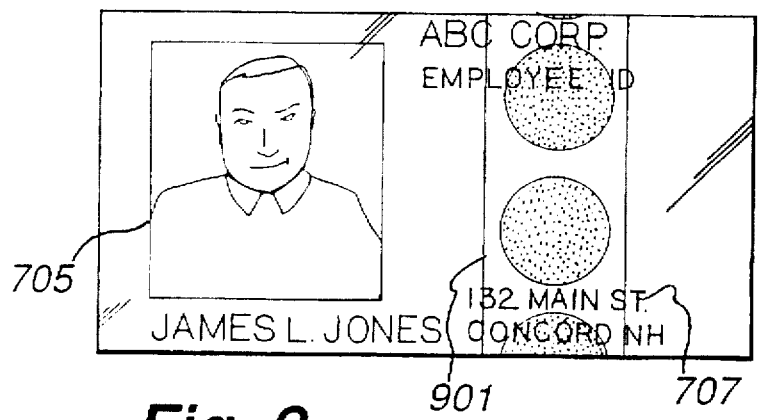
FIG. 9 is a secured document prepared in accordance with another aspect of the present invention.

As illustrated in FIGS. 8 and 9, the structure described above in connection with FIGS. 6A, 6B and 7A–7C may be used to secure a document, such as an identification card. FIGS. 8 and 9 generally show documents secured using overlaminates carrying semi-transparent holograms. FIG. 9 shows the simplest system, where the hologram 901 is randomly repeated a plurality of times in at least one direction across the document. The entire randomly repeated hologram 901 is metallized with a continuous grid screen, as described above in connection with FIGS. 6A and 6B. A more sophisticated system is illustrated in FIG. 8, in which the hologram 801 is repeated a fixed number of times, e.g. one time, on each document, and a continuous grid screen is again metallized over the entire region in which the hologram might appear. Alternatively, the appearance of the document shown in FIG. 8 might be achieved by a yet more sophisticated approach, in which the grid screen is selectively applied only to the actual hologram within the region, and precisely registered thereto. Other variations on overlaminate systems are shown and described now, in connection with FIGS. 7A–7C.

In the example of FIG. 7A, the overlaminate sheet has embossed thereon an area 709 having a surface relief pattern 711 comprising an overall holographic repeatinge pattern or diffraction grating, known to those skilled in the art as a random repeat. Each identification card thus receives one or more full or random portions of the repeating pattern 711. The surface relief pattern 711 of the overlaminate is enhanced by a continuous grid screen, as described above in connection with FIGS. 6A and 6B. As a result, both the surface relief pattern 711 and the underlying printed 707 and pictorial 705 information on the identification card are observable. Areas of the overlaminate which cover underlying identification information 705 and 707 may be clear or may be metallized with a continuous grid screen to form a semi-transparent hologram. Areas of the overlaminate which do not cover any underlying identification information may be made opaque with a more complete metallization, metallized text 713 or metallized graphics 715.

As shown in the example of FIG. 7B, the device of FIG. 7A may be enhanced by forming a high frequency, electromagnetically resonant structure 717 in the metallization layer. A series-resonant inductor 719 and capacitor 721a and 721b (LC) circuit, as shown, may operate in the 8–10 MHz range. The particular, precise frequency of resonance could serve as a code indicative of authenticity. In the illustrated structure, when the overlaminate is folded and applied to a document to be secured, the plates 721a and 721b act as a capacitor, with the secured document between them forming the dielectric. A coil 719 completes the resonant circuit. As in FIG. 7A, each identification card receives one or more full or random portions of the repeating pattern 711. The surface relief hologram of the overlaminate is enhanced by a continuous grid screen, as described above in connection with FIGS. 6A and 6B. Again, both the hologram and the underlying printed and pictorial information on the identification card are observable. Areas of the overlaminate which cover underlying identification information may be clear or may be metallized with a continuous grid screen to form a semi-transparent hologram. Areas of the overlaminate which do not cover any underlying identification information, for example those portions of the overlaminate corresponding to the back of the identification card, may be made opaque with a more complete metallization, metallized text or metallized graphics.

The structure of FIG. 7C is again similar to that of FIGS. 7A and 7B. However, microwave frequency resonant structures 723, which operate in the GHz frequency ranges are formed in the metallization, rather than the high frequency LC resonant circuit 717. The microwave frequency resonant structures 723 are simply metallized areas of shapes computed to exhibit desired resonances. In this type of structure, the particular combination of resonant frequencies serves as a code indicative of authenticity.

Each of FIGS. 7A–7C show the random repeating hologram 711 as appearing in a machine-direction lane 709 of the overlaminate material 701. That is, each overlaminate blank 701 is cut from a web processed by moving through the embossing and metallization machines in the machine-direction. An advantage of this arrangement is that overlaminate blanks of an arbitrary size in the machine direction could be cut from such a web. Prior to metallization, the size of the blank in the machine direction is not fixed. When the grid screen is applied over the entire holographic lane, the size of the blank in the machine direction remains unfixed. Once a grid screen is applied to areas which have a fixed repeat, the size of the blank would become fixed, however, similar overlaminate stock already carrying random repeat commercial holograms could be metallized in different sizes at different times, without having to replace the stock. The random repeat occurs at such a high spatial frequency as to ensure that a wide variety of overlaminate sizes are accommodated by the web. Indeed, the repeat frequency of overlaminate blanks along the web in the machine direction is determined by the metallization pattern, particularly in such embodiments as shown in FIGS. 7B and 7C. Those embodiments have features intended to show up exactly once on each blank.

In a different arrangement of the overlaminate blank, each blank may be assumed to be of a fixed size, and each blank may include features intended to show up a fixed, predetermined number of times.

As mentioned above and illustrated in FIG. 8, the structure described above in connection with FIGS. 6A, 6B, 7D and 7E may also be used to secure a document, such as an identification card. In this case, each individual overlaminate has a similar hologram, which appears in a predetermined location, only a predetermined number of times on the overlaminate blank.

Figure 7D:
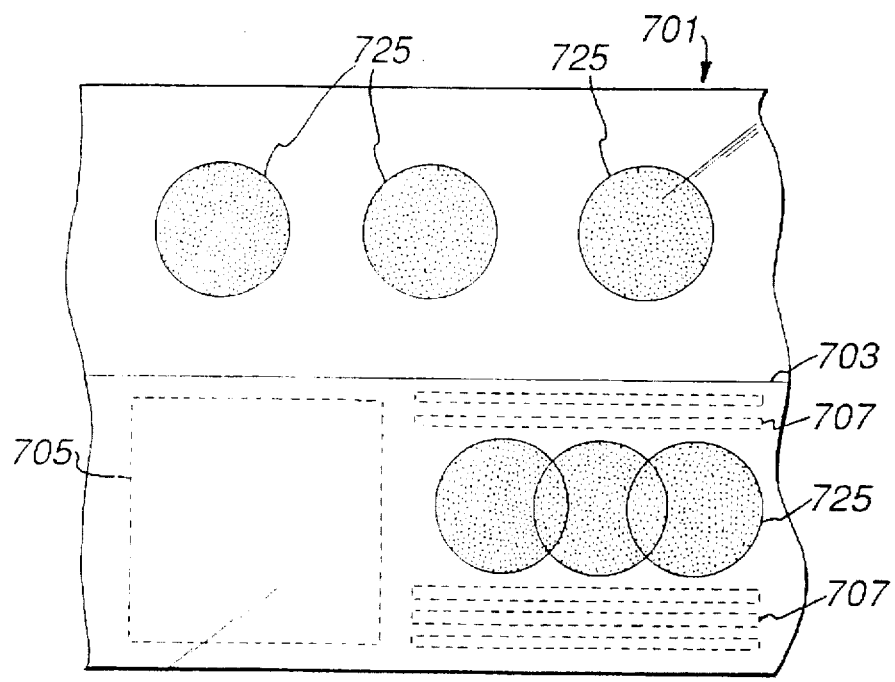

In FIG. 7D, an embodiment is shown in which a fixed number of holograms 725 appear at predetermined locations on the web. The metallization is applied selectively to and registered with these fixed hologram locations 725. The holograms 725 may be opaque or semi-transparent, as required. Areas where the overlaminate is required to be transparent may be left free of metallization. Unlike in the embodiments of FIGS. 7A–7C, the clear areas need not run in machine-direction lanes, because the metallization is registered with the underlying holograms 725.

Figure 7E:
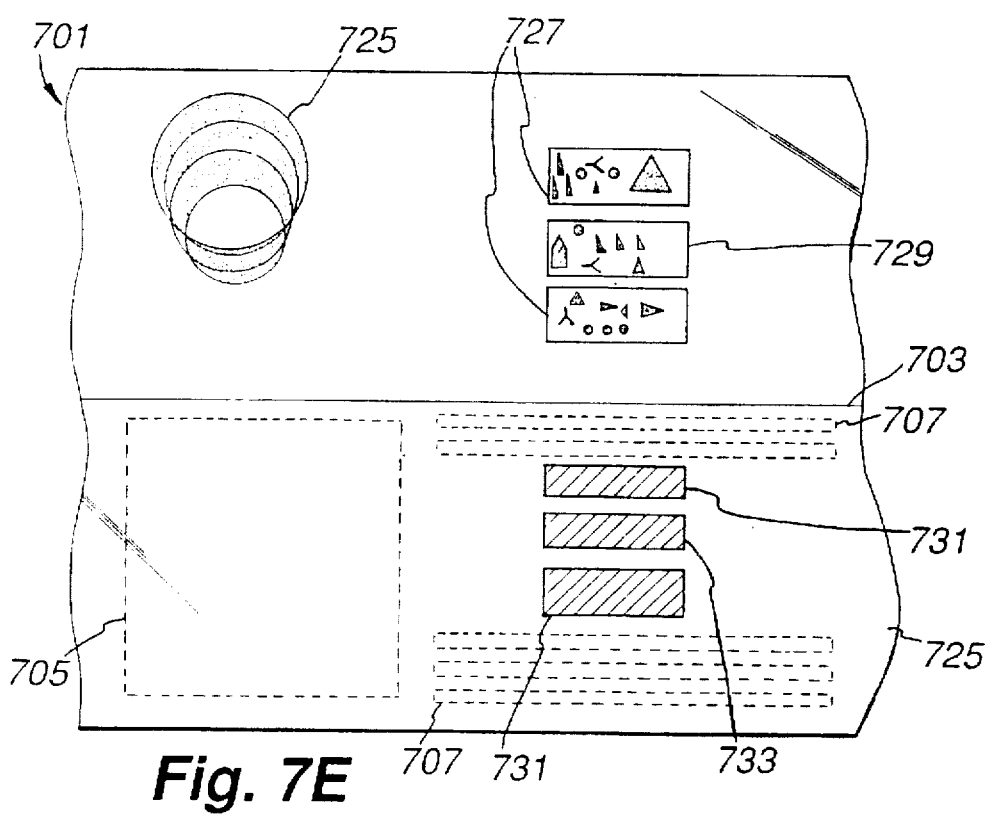

The embodiment of FIG. 7E illustrates yet another refinement available by use of the present invention. The metallization pattern registered to the holograms 725 may be, for example, a half-tone image of the intensity information of the original hologram from which the surface relief hologram was produced. Thus, an enhanced contrast hologram may be produced. Such an enhanced contrast hologram would be extremely difficult for a counterfeiter to reproduce, because of the difficulty in achieving registration of the surface relief pattern with the metallization. Likewise, microscopic structures 727 and 728 which are essentially undetectable to the viewer, but which may be observed with special equipment, could be registered with the hologram so as to make counterfeiting more difficult. For example, information could be encoded in the form of electromagnetically resonant structures 727 and 729. By causing the structures to be registered with selected portions of the metallization, they may be placed so that when the overlaminate is applied to a document, some (e.g. 727) are located behind electromagnetically opaque portions of the grid screen 731 while others (e.g. 729) are located behind electromagnetically transparent portions 733 of the grid screen. When a document secured with such a system is tampered with, the formerly undetectable resonant structures 727 located behind the opaque portions 731 of the grid screen may become detectable because continuity of the formerly opaque portions 731 of the grid screen may become broken.

Pattern metallized printing processes have been developed using equipment sold in the United States by Galileo Vacuum Systems, Connecticut, and Leybold Technologies, Inc., Connecticut. These systems are custom built to operate within and in connection with various makes of vacuum metal deposition equipment. Generally speaking, these systems operate by depositing a substance, such as an oil, onto the surface of a web which subsequently undergoes vacuum metal deposition. The substance is selected to cause the metal to fail to adhere to selected portions of the web, thus permitting metallic patterns to be deposited on the web with a resolution limited only by the substance deposition process.

Extremely fine resolution metallization patterns are possible using this technique. The actual resolution achieved depends on several factors. The ultimate limit to resolution of this system depends upon the quantity and placement of the substance on the web. These are subject to design parameters which are generally worked out by the system manufacturer and customer.

In one machine for practicing the above-described method, the substance used is a diffusion pump oil having release characteristics similar to silicone oil. Other similar materials may also be used, provided they prevent the adhesion of vaporized metal to the surface on which they have been deposited. The entire process may be enclosed within a vacuum deposition chamber.

The process and machine described thus far are suitable for producing articles of the general types shown in FIGS. 7A–7C. The process and machine is also capable of producing articles having substantially similar characteristics to the holographic overlaminates illustrated, such as articles having extremely fine metallic lettering, fine metallic diffraction gratings, and the like.

As mentioned above, the described process may include techniques to produce metallization patterns closely registered with underlying features of the substrate, such as illustrated in FIGS. 7D and 7E.

Techniques for registering a pattern formed by a deposited substance, and hence the resulting metallization, with an underlying hologram are similar to those well-known in the printing arts, but are unknown in the metallization arts. They generally involve separately controlling the speed of various rollers or web accumulation devices over which a substrate web passes and which produce the pattern, to subtly alter the phase between the pattern and the underlying surface relief pattern present on the web. Extremely precise registration, similar to that achievable in printing arts, is thus achievable in metallization.

Figure 10:
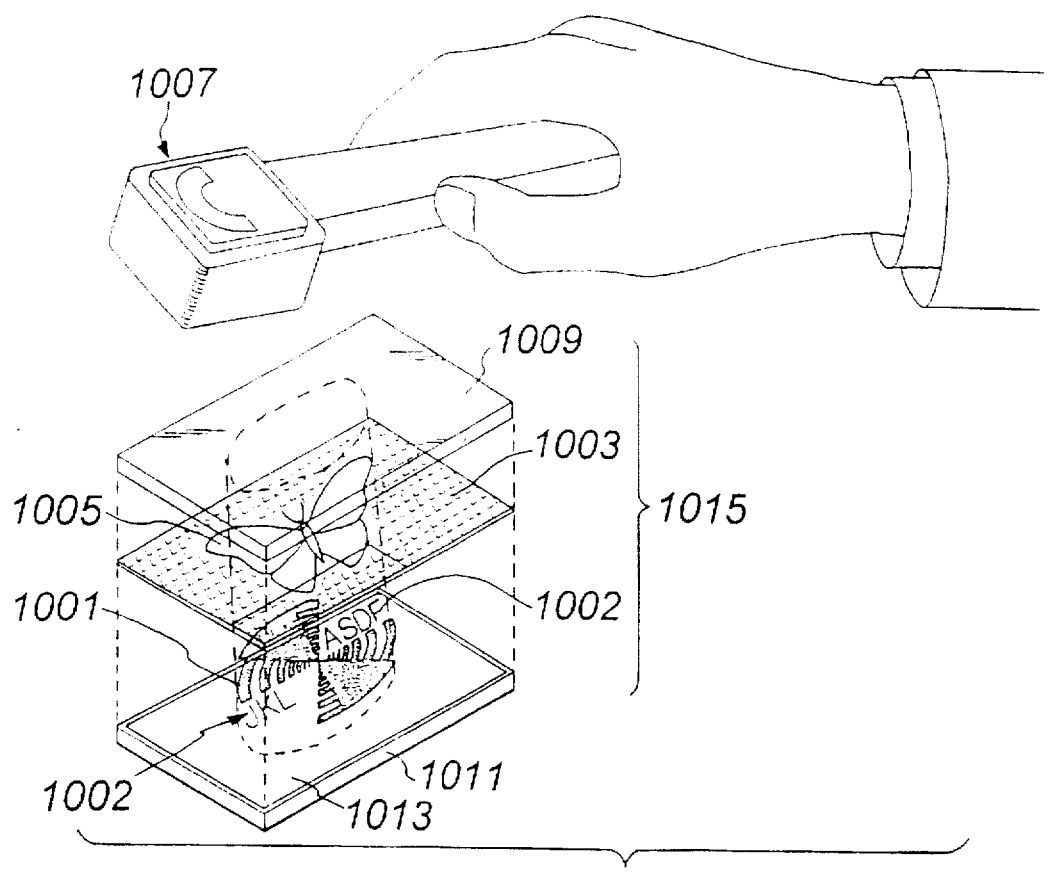
FIG. 10 is an exploded view of a security device in accordance with various aspects of the present invention.

Employing elements from those aspects of the invention and methods discussed above, a new and useful security device may be made as shown in exploded view in FIG. 10. Authentication by both overt and covert means is achieved by this new device.

The security device of FIG. 10 is achieved by disposing a metallic pattern 1001 in registration with a layer 1003 having a surface relief hologram 1005 thereon, as described above. Both the metallic pattern 1001 and the surface relief hologram 1005 exhibit the same machine direction repeat. The device illustrated in FIG. 10 has already been separated from other similar devices produced on a single substrate, so that only one instance of the surface relief hologram 1005 and metallic pattern 1001 are present. As discussed in detail, above, the structure is disposed between a clear PET film 1009 covering the device and a paper document substrate 1011. The device is adhered to the paper 1011 by a transparent adhesive layer 1013 disposed between the paper 1011 and the metallic pattern 1001. The layer 1003 coated onto PET film 1009 may be omitted and the surface relief hologram 1005 embossed directly on the PET film 1009.

The metallic pattern 1001 shown amplifies the surface relief hologram 1005, as discussed above with respect to other embodiments of the invention. Also as discussed above, the metallic pattern 1001 may be of the continuous grid type, which is conductive, yet not opaque. A layer of about 200 Å of Al with a protective layer of about 25 Å of $AlO_2$ is preferred. The thickness of the metallic pattern layer and the protection layer may be varied by one of ordinary skill in this art to achieve different levels of transparency, oxidation protection and other parameters as required. The item to which the device may be applied may thus be viewed through the surface relief hologram 1005 on which the metallic pattern 1001 has been applied. However, the illustrated device is difficult for a counterfeiter to reproduce, because the precise registration between the surface relief hologram 1005 and the metallic pattern 1001 is difficult to reproduce. The amplified surface relief hologram (1005 combined with 1001) provides an overt indication of authenticity, in that it is optically detectible, readily verifiable by human observation, and yet difficult to reproduce. The overt indicia of authenticity could also include metallization micro-printing 1002, which may be readily detected with modest magnification, but which is exceedingly difficult to reproduce. The characters of micro-printing 1002 may be 0.025" high, for example.

In addition to the overt indication of authenticity provided by the device, there may be provided covert indications of authenticity. For example, the metallic pattern 1001 may form one or more resonators or antennae, which when illuminated by electromagnetic energy swept through a predetermined frequency range at a predetermined rate of frequency change, radiated by a transceiver 1007, re-radiates that electromagnetic energy resonating at one or more predetermined frequencies. The re-radiated energy may be detected by a receiver section of the transceiver 1007, in which the received spectrum is compared with the pattern produced by a valid device. The receiver could perform a spectrum analysis over a frequency range of interest. The spectral signature of a valid device is then compared with the spectrum of the received energy. A decision regarding the authenticity of the device may then be made based on the comparison.

Devices may be produced which provide similar or indistinguishable overt indicia of authenticity, but which encode different covert indicia, by varying the millimeter resonators included in metallic pattern 1001. Furthermore, additional, transparent conductors may be connected to the metallic pattern 1001, altering the electrical characteristics of the device, but visually non-detectible. Since a wide variety of codes could thus be produced, the device could be used, for example, to identify goods intended for different market channels, to identify goods manufactured at different plants, or to identify goods manufactured or shipped at different times, etc. Those skilled in the art would be able to identify numerous types of useful information which could be encoded in the spectral characteristics of the metallic pattern 1001.

A second electromagnetic characteristic of a patterned metallic holographic label which may be used to electronically authenticate a patterned metallized holographic tag or label is the metallic pattern's inherent impedance. Impedance is taken to refer to a complex impedance having both a magnitude and a phase. A complex quantity is required to describe a structure's impedance because the structure may include both resistance and reactance. A structure's impedance, of course, is a function of frequency. Furthermore, it is well known that network analyzers determine a structure's impedance as a function of frequency by measuring the structure's reflection coefficient as a function of frequency. Like impedance, the reflection coefficient of a structure is taken to be a complex quantity represented by a magnitude and a phase because the structure may have both resistance and reactance. Knowing the reflection coefficient at a given frequency, impedance at the given frequency is readily calculated. Measured at several frequencies, a structure's reflection coefficients characterize and parameterize a structure including conductive, magnetic and dielectric components to such a degree that the reflection coefficients can be used to authenticate a patterned metallized holographic security tag or label with a reasonable degree of certainty. As the reflection coefficient is 1) directly related to the tag's impedance at the measurement frequency, and 2) a function of both the metallic pattern and component substrates, it represents a measurable, identifiable, authenticating electromagnetic signature.

A hand held device 1007, having the capability to generate and radiate up to four frequencies, for example, which functions similarly to a network analyzer can measure and store the four reflection coefficients of an authentication label 1015. The hand-held, miniature, network analyzer 1007 emits four low-level microwave signals which are reflected by the patterned metallized security tag or label 1015, the reflected signals are compared to reference signals to produce the tag's reflection coefficients. These four reflection coefficients characterize the authentication tag 1015 and can be compared a valid tag's reflection coefficients in order to make an authentication decision. In order to function effectively the authentication device 1007 should be positively positioned with respect to the authentication label 1015. Direct contact would clearly positively position the authentication device and is one option. Repeatable results are ensured by providing a repeatable sensor-tag-sensor path length.

The impedance of the authentication device 1007 may be measured by other means. For example, an instrument such as the MDA-1000 microwave dielectric analyzer (KDC Technology Corporation; Acton, Mass.) could be readily adapted by one skilled in this art to determine the impedance of authentication device 1007. The MDA-1000 uses an open reflection microwave resonator driven by a low-level microwave signal which is stepped through a narrow band of frequencies covering the resonator's resonant frequency. Resonant frequency and return loss of the signal affected by the material under test are measured. Impedance may then be calculated therefrom. It will be understood by those skilled in this art that other measurement techniques are adaptable to the task of measuring the impedance of the authentication device 1007.

Figure 12:
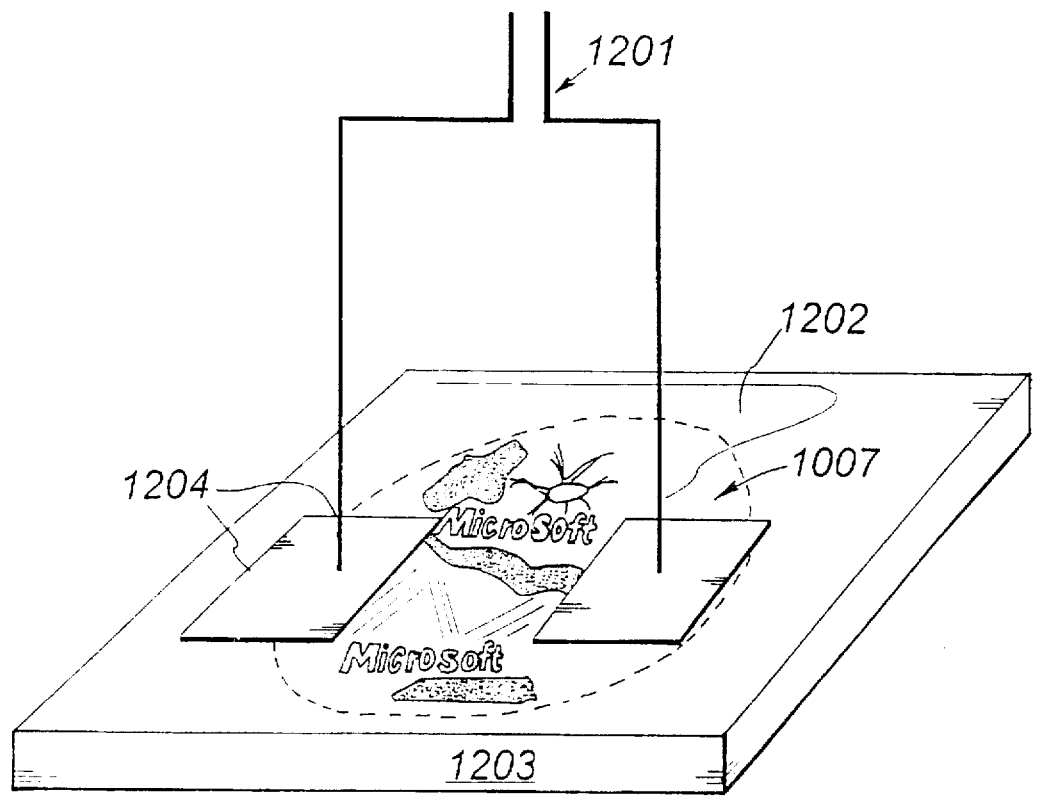
FIG. 12 is a perspective view of a security device and probe embodying yet another aspect of the invention.
Figure 13:
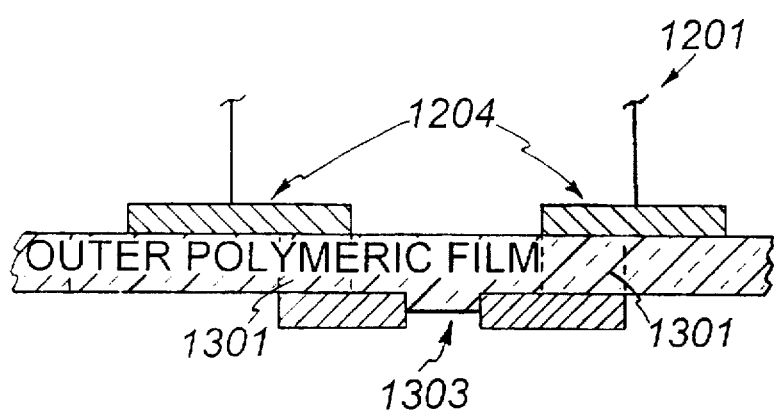
FIG. 13 is a cross section view of one construction of the security device and probe of FIG. 12, taken at line 13—13.

A third authentication mechanism based on the electrical characteristics of a tag or label, measures the capacitance of a patterned metallized, holographic security tag with a custom designed, hand-held, bridge capacitance meter. FIG. 12 illustrates a simple probe 1201 which includes a plurality of capacitive plates 1204 of opposite polarities. The probe 1201 contacts the authentication tag 1202 in a predetermined position and the tag's capacitance is measured. The tag's capacitance is a function of 1) the thickness and dielectric constant of the polymeric film 1203 between the probe and the metallized pattern, and 2) the metallic area (FIG. 13, 1301) in closest proximity to the probe plates 1204. A connected metallized area 1302 shown in FIG. 13 is a contiguous metallic area which when projected onto the contacted surface of tag 1202, links at least part of the area contacted by two probe plates 1204 of opposite polarity. Furthermore, only that area 1301 of a connected area in immediate proximity to probe plate contributes significantly to the measured capacitance. Similar metallic patterns can have different capacitive signatures due to subtle metallic connections between a metallic areas making one a contiguous connected area and the other merely part of a metallic camouflage. As subtle connections can make a contiguous metallized area a connected area and thus contribute to the measured capacitance, thin strips linking metallized areas under probe-plates can also function as fuses 1303. For example, when a fuse 1303 linking two larger areas, one underneath the one probe-plate and the second under the other probe-plate, is intact, the connected area contributes to the measured capacitance. When the fuse link is broken, the metallized area is no longer a connected area and hence does not contribute appreciably to the measured capacitance. Simply by applying a large charge to the probe-plates of the same probe 1201 which measures the capacitance, or otherwise bringing an electric field sufficient to induce a fusing current into proximity with the device, the fuse link 1303 can be deliberately broken, changing the measured capacitance. Likewise, in this embodiment or the previously described embodiment involving re-radiation of electromagnetic energy, a fuse link may be broken by applying a time-varying magnetic field of sufficient strength to induce a fusing current. This allows authentication labels to be deactivated by the same device which authenticates the tag.

Figure 14:
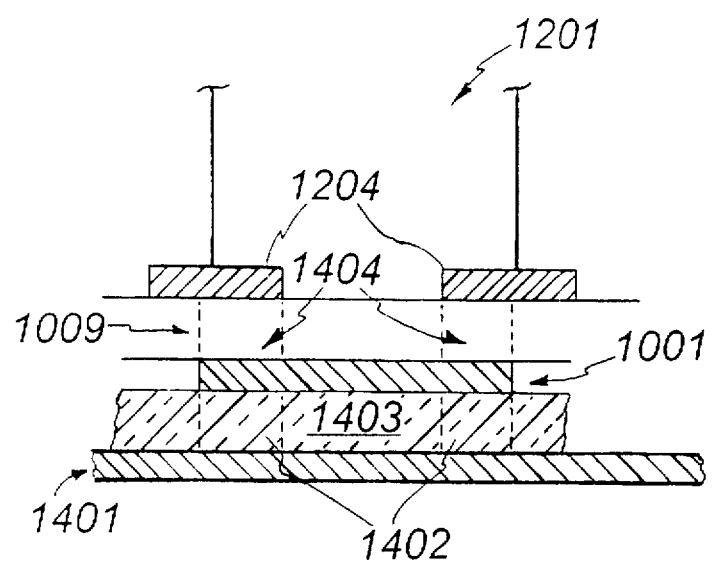
FIG. 14 is a cross section view of another construction of the security device and probe of FIG. 12, taken at line 13—13.

In addition to these features, a more covert feature can be incorporated into the capacitor tag. As shown in FIG. 14, by employing on a second substrate a second metallic layer 1401 which may be patterned or continuous and which is separated from the first metallic layer, the tag's measured capacitance can be increased. To contribute to the measured capacitance the buried metallic layer must be electrically continuous and its projection on the plane of the first metallized layer must overlap at least those areas 1404 of the first patterned metallized area linking two probe plates of opposite polarity as discussed above. The measured capacitance then, in addition to other factors previously enumerated, becomes a function of these second connected areas 1402 and the thickness and dielectric constant of the second polymeric film 1403.

There are two further measures, which would significantly increase the difficulty of counterfeiting a capacitor tag. One is to choose for this buried, hidden layer a conductive substance, such as zinc, which readily oxidizes when exposed to the atmosphere. A second is to use a transparent conductive material. Each of the readily oxidizable conductive substance or the transparent conductive substance could be used in combination with a more conventional metallic conductive material or with each other. A counterfeiter, in order to replicate a valid tag, must first examine a valid tag to determine its structure. During this examination the transparent conductive material may not be detected or the readily oxidizable conductive material may be exposed to atmosphere thus preventing the conductive layer's constituent material, location and or size being completely determined. A counterfeit tag made without precise and complete information concerning the buried conductive layer would, if measured, not indicate the same capacitance as a valid tag and consequently would not be authenticated.

Patterned metallized holographic security tags or labels which appear the same to the unaided eye but which have different underlying metallic patterns, each having a unique electromagnetic signature which can be detected and decoded, provide the basis of a product security system which provides two desirable ingredients: 1) a visual authentication component, i.e., the pattern metallized hologram; and 2) a covert authentication means. The intended country of retail or other information could be encoded in the electronic signature of a tag, aiding deterrence of grey marketing or providing other useful product tracking features. The device which authenticates the holographic security tag could detect such encoded information about the product's place of manufacture or intended market.

Figure 11:
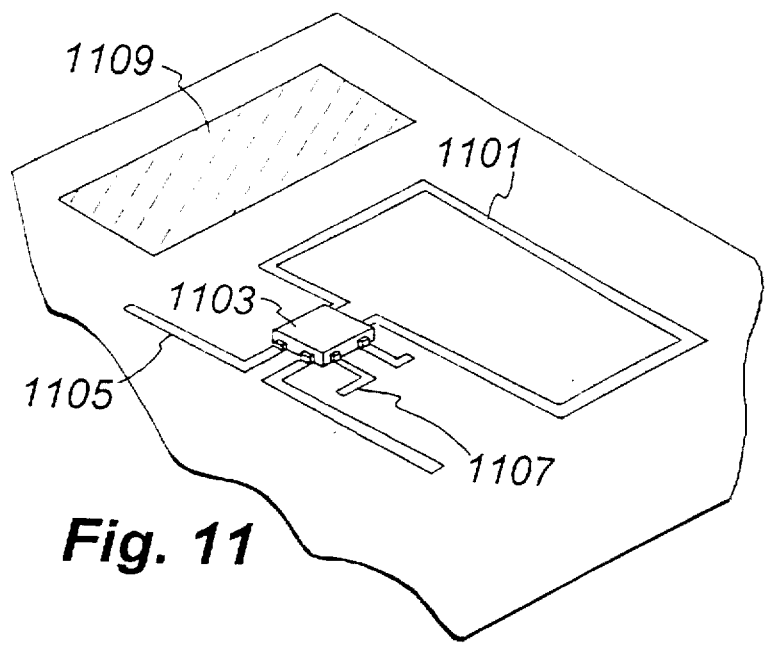
FIG. 11 is a perspective view of a smart card embodying yet another aspect of the invention.

As shown in FIG. 10, the conductive nature of the grid screen lends itself to combinations in which integrated circuits are used, such as so called smart cards. Smart cards are security or credit devices which have embedded therein electrical circuitry, typically an integrated circuit. The cards are designed to communicate with systems external to the card. One major design consideration is powering the smart card. The smart card may be powered by inductively coupling electromagnetic energy from an external source of electrical power to the smart card. For example, if the smart card is placed in close proximity to an external electrical circuit capable of generating a time varying magnetic flux within a specific frequency range, electrical energy can be coupled to one or more pattern metallized pick-up loops. For example, in FIG. 11, loop 1101 may be used to receive power for operating integrated circuit 1103. Loop 1101 is, for example, a conductive pattern metallized grid screen, which would be semi-transparent. Thus, radiated energy from an external source (not shown) powers the embedded integrated circuit 1103. The system may also include an external processor and transmitter which form a transponder system. A metallic pattern provides the conductive loop 1101 for power, a receiving antenna 1105, a transmitting antenna 1107 and the electrical connections to the embedded microchip. The microchip may be queried by external electrical circuitry through an encoded message which the integrated circuit 1103 receives through antenna 1105. The integrated circuit 1103 then decodes and responds through antenna 1107, accordingly.

Finally, the system is compatible with any of the earlier-described embodiments, which may be located on the smart card in an unused space 1109, for example.

The present invention has now been described in connection with several particular embodiments thereof. The embodiments described are provided for illustrative purposes, only. Numerous variations and modifications of these embodiments will now be evident to those skilled in this art, which are contemplated to be within the scope of this invention. Thus, the scope of the invention is not intended to be limited by the foregoing description, but rather the scope of the invention is intended to include all subject matter encompassed by the appended claims and the equivalents thereto.

What is claimed is:

1. A security device, comprising:
   a substrate, one surface of which includes a surface relief pattern; and
   a metallic pattern disposed thereon in registration with the surface relief pattern, so as to amplify visibility of the surface relief pattern to an observer; wherein
   the metallic pattern also forms a high frequency resonant structure.

2. The device of claim 1, further comprising:
   metallic letterforms disposed on the substrate.

3. The device of claim 2, wherein the metallic letterforms are too small to be distinguished with unaided eyes.

4. A security device, comprising:
   a substrate;
   an integrated circuit device for controlling power supplied thereto to process a signal also supplied thereto, the integrated circuit disposed on the substrate; and
   a metallic pattern disposed on the substrate and defining conductive regions on the substrate, the pattern including a means, connected to the integrated circuit, for receiving power electromagnetically coupled thereto and for supplying the power to the integrated circuit.

5. The device of claim 4, wherein the metallic pattern further comprises:
   means, connected to the integrated circuit, for coupling thereto the signal.

6. The device of claim 5, wherein the signal includes high frequency electromagnetic signals, and the means for coupling further comprises:
   an antenna which transmits and receives the high frequency electromagnetic signals.

7. The device of claim 4, operating in proximity to a source of electromagnetic energy, wherein the means for receiving power further comprises:
   an inductive loop which receives sufficient electromagnetic energy to supply power to the integrated circuit; and
   an antenna which couples the signal to the integrated circuit.

8. The device of claim 4, further comprising:
   a surface relief pattern on a surface of the substrate; and wherein
   a region of the metallic pattern is disposed on the surface relief pattern in registration with the surface relief pattern, so as to amplify visibility of the surface relief pattern to an observer.

9. A method of authenticating an article, comprising the steps of:
   adhering to the article a surface relief hologram;
   disposing a metal pattern on the surface relief hologram so as to amplify visibility of the surface relief hologram to an observer;
   illuminating the metal pattern with electromagnetic energy swept over a predetermined frequency range and at a predetermined rate; and
   analyzing re-radiated electromagnetic energy to authenticate the article.

10. The method of claim 9, wherein the step of analyzing further comprises the step of:
    comparing a spectrum of the re-radiated electromagnetic energy to an expected spectral signature of the metal pattern.

11. A method of authenticating an article, comprising the steps of:
    adhering to the article a surface relief hologram;
    disposing a metal pattern on the surface relief hologram so as to amplify visibility of the surface relief hologram to an observer;
    measuring a frequency-dependent parameter of the article; and
    comparing the measured frequency-dependent parameter of the article to an expected frequency-dependent parameter of an authentic article.

12. The method of claim 11, wherein the step of measuring is measuring an electrical impedance of the article at a plurality of frequencies.

13. The method of claim 11, wherein the step of measuring is measuring a plurality of reflection coefficients of the article at a corresponding plurality of frequencies.

14. A method of authenticating an article, comprising the steps of:
    adhering to the article a device including a surface relief hologram;
    disposing a metal pattern on the surface relief hologram so as to amplify visibility of the surface relief hologram to an observer, the metal pattern positional between the surface relief hologram and the article;
    measuring capacitance of the metal pattern; and
    comparing the capacitance measured with an expected capacitance.

15. The method of claim 14, further including deactivating authentication, further comprising the steps of:
    forming the metal pattern of a plurality of areas connected by a fusible link; and
    generating an electric current between the plurality of areas, thereby causing the fusible link to break.

16. The method of claim 15, wherein the step of generating further comprises the step of:
    bringing an electric charge into proximity with the plurality of areas.

17. The method of claim 15, wherein the step of generating further comprises the step of:
    applying an electric field to the plurality of areas.

18. The method of claim 15, wherein the step of generating further comprises the step of:
    applying a time-varying magnetic field to the plurality of areas.

19. A pattern metalized security system, comprising:
    a substrate, one surface of which includes a surface relief pattern;
    a first metallic pattern disposed on the surface relief pattern so as to amplify visibility thereof to an observer; and
    a probe having a plurality of capacitive plates of opposite polarity; wherein
    the first metallic pattern is disposed in such a position that a projection thereof on an outermost surface of the substrate covers an area linking at least two plates of opposite polarity of the probe.

20. The device of claim 19, further comprising:

a second metallic pattern disposed in a position electrically insulated from the metallic pattern and also having a projection on the outermost surface of the substrate linking the at least two plates of the opposite polarity of the probe.

21. The device of claim 19, wherein the first metallic pattern further comprises;

a plurality of conductive areas electrically connected by fusible links.

22. A security device, comprising:

a substrate having a surface relief pattern disposed thereon; and a metallic pattern disposed thereon in registration with the surface relief pattern, so as to amplify visibility of the surface relief pattern to an observer; wherein the metallic pattern also forms elements of an electromagnetic circuit.

23. The device of claim 22, wherein a plurality of the elements formed by the metallic pattern are interconnected by a transparent conductor.

24. A security device, comprising:

a substrate having a surface relief pattern disposed thereon; and a metallic pattern disposed thereon in registration with the surface relief pattern; wherein the metallic pattern forms elements of an electromagnetic circuit; and further wherein a plurality of the elements formed by the metallic pattern are interconnected by a readily oxidizable substance disposed on a surface of the substrate.

25. The device of claim 24, further comprising:

a layer of adhesive disposed on the surface of the substrate and protecting the readily oxidizable substance disposed thereon from exposure to ambient atmosphere.

* * * * *